US011593418B2

(12) United States Patent
Jensen et al.

(10) Patent No.: US 11,593,418 B2
(45) Date of Patent: *Feb. 28, 2023

(54) SYSTEM AND METHOD FOR A SEMANTICALLY-DRIVEN SMART DATA CACHE

(71) Applicant: Aetna Inc., Hartford, CT (US)

(72) Inventors: Claus T. Jensen, Pawling, NY (US); Joseph Arnold, Fort Washington, PA (US); John A. Pierce, Jr., Manchester, CT (US); Robert Samuel, Blue Bell, PA (US); Sriram Ganesan, North Wales, PA (US)

(73) Assignee: Aetna Inc., Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/399,301

(22) Filed: Aug. 11, 2021

(65) Prior Publication Data
US 2021/0374172 A1    Dec. 2, 2021

Related U.S. Application Data

(63) Continuation of application No. 15/496,691, filed on Apr. 25, 2017, now Pat. No. 11,120,065.
(Continued)

(51) Int. Cl.
*G06F 16/00*   (2019.01)
*G06F 16/35*   (2019.01)
(Continued)

(52) U.S. Cl.
CPC ............ *G06F 16/355* (2019.01); *G06F 12/00* (2013.01); *G06F 12/0868* (2013.01);
(Continued)

(58) Field of Classification Search
CPC .. G06F 12/00; G06F 12/0868; G06F 16/3344; G06F 16/355; G06F 2212/1024; G06F 2212/465
See application file for complete search history.

(56) References Cited

U.S. PATENT DOCUMENTS

2001/0032257 A1\* 10/2001 Wells .................... H04L 41/024
709/204
2010/0114899 A1\* 5/2010 Guha .................. G06F 16/9535
707/E17.089
(Continued)

OTHER PUBLICATIONS

U.S. Appl. No. 15/496,691, filed Apr. 25, 2017.

*Primary Examiner* — Dinku W Gebresenbet
(74) *Attorney, Agent, or Firm* — Leydig, Voit & Mayer, Ltd.

(57) ABSTRACT

A method of integrating data across multiple data stores is provided. The method includes ingesting diverse data from multiple data sources and reconciling the ingested diverse data by updating semantic models based on the ingested diverse data. The method further includes storing the ingested diverse data based on one or more classification of the data sources according to the semantic models and automatically generating scalable service endpoints that are semantically consistent according to the classification of the data sources. The generated scalable service endpoints are application programming interfaces. The method also includes determining a protocol based on the scalable service endpoints in response to receiving a call from the one or more recipient systems and responding to the call from the one or more recipient systems by providing data in the classification of the data sources.

20 Claims, 7 Drawing Sheets

Related U.S. Application Data

(60) Provisional application No. 62/382,421, filed on Sep. 1, 2016.

(51) Int. Cl.
    *G06N 20/00*     (2019.01)
    *G06F 16/33*     (2019.01)
    *G06F 12/00*     (2006.01)
    *G06F 12/0868*     (2016.01)
    *G06N 20/10*     (2019.01)

(52) U.S. Cl.
    CPC ......... *G06F 16/3344* (2019.01); *G06N 20/00* (2019.01); *G06N 20/10* (2019.01); *G06F 2212/1024* (2013.01); *G06F 2212/465* (2013.01)

(56) References Cited

U.S. PATENT DOCUMENTS

2014/0298138 A1*   10/2014   Gladwin ................ H04L 65/70
                                                    714/763
2016/0034445 A1     2/2016   Setayesh et al.
2017/0068891 A1*   3/2017   Shironoshita ........... G06F 40/30

* cited by examiner

SYSTEM AND METHOD FOR A SEMANTICALLY-DRIVEN SMART DATA CACHE

CROSS-REFERENCE TO RELATED APPLICATIONS

This application claims the benefit of U.S. Provisional Application No. 62/382,421, filed on Sep. 1, 2016, and U.S. patent application Ser. No. 15/496,691, filed on Apr. 25, 2017, which are hereby incorporated by reference in their entirety.

BACKGROUND

Enterprise systems include servers, storage and associated software deployed in a large scale that may serve as an information technology infrastructure for businesses, governments, or other large organizations. Enterprise systems manage large volumes of data and are designed to offer and provide high levels of transaction performance and data security. These systems are also designed to support business processes, information flows, data analytics, and other functions. Enterprise systems include various individual system assets and resources. In the age of complexity of information, enterprise systems manage myriad data sources containing simple flat files and relational databases to unstructured and geo-spatial data. This, in turn, increases complexity of providing access to diverse data sources to consuming applications.

BRIEF SUMMARY

An embodiment of the disclosure provides a method of integrating data across multiple data stores in a smart cache in order to provide data to one or more recipient systems. The method includes automatically ingesting diverse data from a plurality of data sources, automatically reconciling the ingested diverse data by updating semantic models based on the ingested diverse data, storing the ingested diverse data based on one or more classification of the data sources according to the semantic models, automatically generating scalable service endpoints which are semantically consistent according to the classification of the data sources, and responding to a call from the one or more recipient systems by providing data in the classification of the data sources.

Another embodiment of the disclosure provides a non-transitory computer readable medium for integrating data across multiple data stores in a smart cache in order to provide data to one or more recipient systems. The non-transitory computer readable medium contains program instructions for causing a server to perform the method including: automatically ingesting diverse data from a plurality of data sources, automatically reconciling the ingested diverse data by updating semantic models based on the ingested diverse data, storing the ingested diverse data based on one or more classification of the data sources according to the semantic models, automatically generating scalable service endpoints which are semantically consistent according to the classification of the data sources, and responding to a call from the one or more recipient systems by providing data in the classification of the data sources.

Yet another embodiment of the disclosure provides a system for integrating data across multiple data stores in a smart cache in order to provide data to one or more recipient systems. The system includes one or more databases storing semantic models and machine learning algorithms and one or more servers. The servers are configured to: automatically ingest diverse data from a plurality of data sources and automatically reconcile the ingested diverse data by performing one or more of: (a) updating semantic models based on the ingested diverse data, (b) structuring the ingested diverse data, wherein the structuring comprises realigning and reformatting data elements in the ingested diverse data into a standardized representation based on the semantic models, and (c) organizing the ingested diverse data, wherein the organizing comprises aligning the ingested diverse data to multiple structures within the semantic models. The servers are further configured to: store the ingested diverse data based on one or more classification of the data sources according to the semantic models, automatically generate scalable service endpoints which are semantically consistent according to the classification of the data sources, and respond to a call from the one or more recipient systems by providing data in the classification of the data sources.

DETAILED DESCRIPTION

Figure 1:
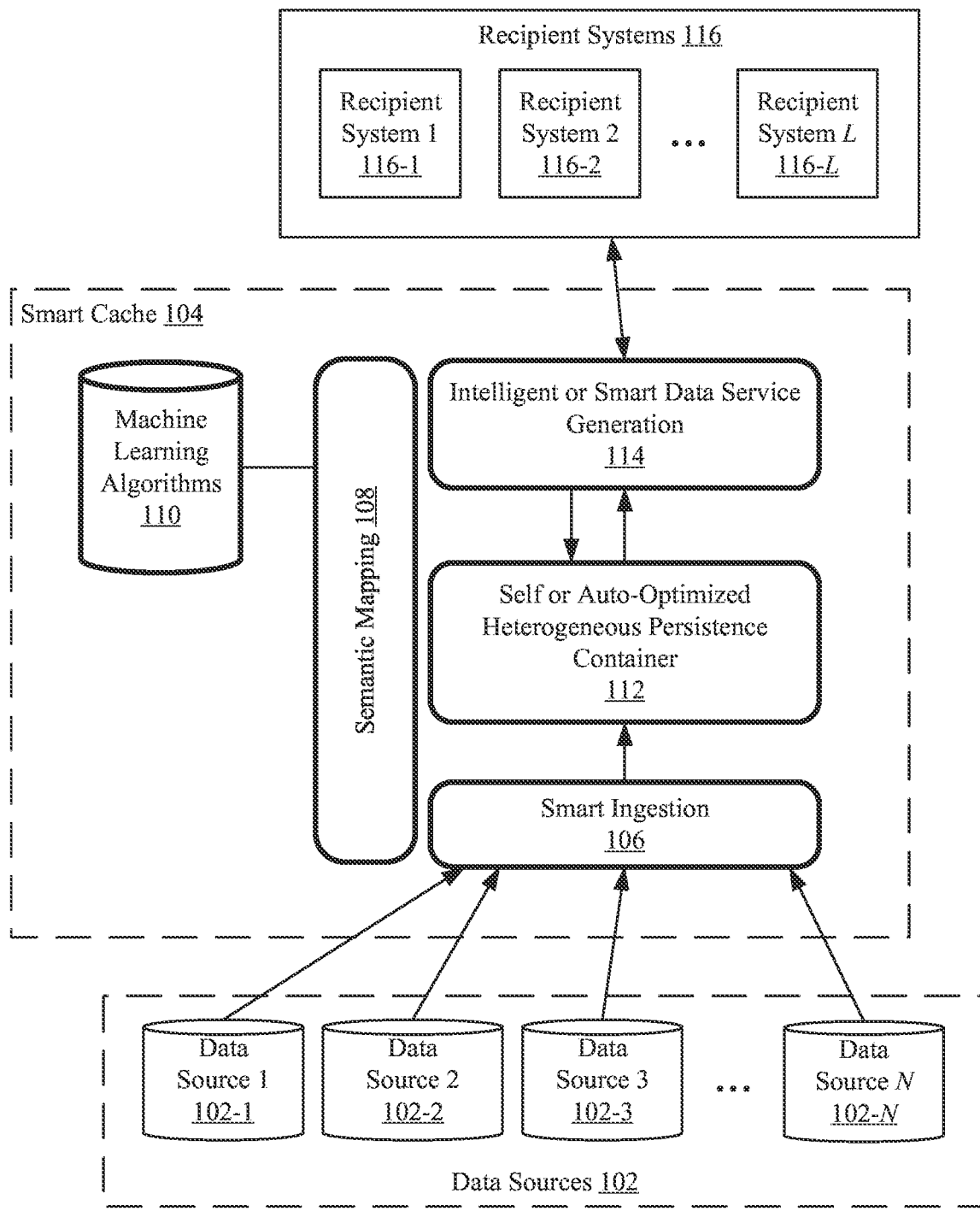
FIG. 1 illustrates a system level diagram showing various components of a semantically driven smart cache according to some embodiments of the disclosure.

Data access and data integration industries do not currently have effective ways to virtualize data saved in multiple different data stores and service the data to data customers. Embodiments of the disclosure provide methods and systems whereby data and associated metadata are obtained from multiple data sources and then mapped to a semantic model. After mapping the data to some semantic model, the data is stored in an efficient manner in a smart cache based on a meaning ascribed to the data through the semantic model. The semantic model provides semantic meaning for the data either directly or via an interface or data model. Access points, for example, application programming interfaces, are generated so that internal or external customers and applications can access some form and subset of the data that has been collected from the multiple data sources. An access point includes any interface or means by which data in the smart cache is accessed. These access points or application programming interfaces remain stable as long as the source data remains stable.

Embodiments of the disclosure provide systems and methods to achieve simplified data consumption of information across multiple disparate data sources by providing an intelligent or smart data service that understands data requests from applications and coordinates with a broker to respond back with relevant data results. By simplifying the task for the consuming applications, much more rapid innovation is enabled. By automating the creating and maintenance of the smart cache itself, human error and effort is taken out of the equation and a vaster array of data sources can be collated as data sources for the smart cache. For example, in a software development project, one of the most cumbersome activities to perform is getting to specific data needed. The tasks involved in reaching the data are routine but require great effort. Using the smart cache to ease the activity of obtaining the specific data needed means software development resources may be redirected to focus on innovation.

As such, embodiments of the disclosure provide a semantically driven smart cache that automatically ingests diverse data sources and renders the composite result as a set of defined, stable and scalable service endpoints, without requiring changes in the original data sources. One value of such a cache is smart disintermediation between data sources and data consumers, in a loosely coupled and scalable fashion and with support for multi-speed IT (information technology) through easy harnessing and leveraging of existing data. Multi-speed IT presents a challenge of having different portions of an IT ecosystem evolve at different speeds without having an adverse impact on the rest of the ecosystem.

The smart cache in the disclosure is an intermediary between multiple disparate data sources and recipient systems that seek access to specific data within the data sources. The smart cache system can automatically ingest and semantically categorize existing diverse data sources. The smart cache also performs automated structuring, organization, and optimization of the ingested data based on semantic understanding of same or similar data elements. The algorithms used for the automated structuring, organizing, and optimization may be continuously optimized using machine learning techniques. The smart cache may then perform automated generation of scalable service endpoints which are semantically consistent. In some cases, as long as the ingested sources remain semantically stable, the generated scalable endpoints are stable.

The smart cache achieves automated structuring by realignment and reformatting data elements from a data source into a standardized representation of the data based on its semantic relationship to a subject area and a metadata defined model of the standard representation of that subject area. This allows the data to be viewed and combined in a consistent way across multiple data sources regardless of a format of the source data.

The smart cache achieves automated organization by alignment of the source data to relevant subject areas within the smart cache. Since data sources can potentially provide data about multiple subject areas in a single feed, there is often a need to align the data to multiple structures. Organizing the source data in this way ensures that the data or record is accessible in all relevant contexts identified by metadata identifying subject areas or data classes within the semantic model.

The smart cache achieves automated optimization by preparing the cached data to meet the usage needs of the consuming applications and users as efficiently as possible. Optimization begins with structuring and organizing, as previously described; and in addition to these steps, optimization also includes monitoring cached data usage and caching new representations of the cached data as needed to improve performance and/or throughput for higher demand or highly complex views.

FIG. 1 illustrates a system level diagram showing various components of a semantically driven smart cache 104 according to some embodiments of the disclosure. The smart cache 104 interfaces with data sources 102 and recipient systems 116. Data sources 102 may contain one or more storage units or databases identified as data source 1 102-1 through data source N 102-N. Recipient systems 116 may be one or more computer devices, for example, desktop computers, laptop computers, smartphones, servers, etc. Recipient systems 116 is depicted in FIG. 1 to include recipient system 1 116-1 through recipient system L 116-L.

Data sources 102 store various types/kinds of data. The data stored in data sources 102 may be working data, location data, customer or member identification data, etc. Not shown in FIG. 1 is the path for storing, removing, and replacing data stored in data sources 102. It is assumed that data sources 102 interfaces with other systems that rely on data sources 102 as long term or short term data repository.

Recipient systems 116 request specific data stored in data sources 102 through smart cache 104. Recipient systems 116 run applications that utilize the requested specific data. Smart cache 104 serves as an intermediary between data sources 102 and recipient systems 116.

Smart cache 104 includes a smart ingestion engine 106, a semantic mapping engine 108, a machine learning algorithms depository 110, a self or auto-optimized heterogeneous persistence container 112 (persistence container 112), and an intelligent or smart data service generator 114.

The smart ingestion engine 106 of the smart cache 104 is responsible for understanding diverse data sources, extracting metadata, and dynamically ingesting the metadata into the persistence container 112 based on a trigger from data sources 102. A trigger may be defined as a change in data sources 102, that is, for example, when new data is added to data sources 102, when a new data source N is added to data source 102, when data is removed from data sources 102, when a data source N is removed from data source 102, and when new data replaces old data in data sources 102.

The persistence container 112 holds or stores metadata about underlying data stored in the data sources 102. The persistence container 112 also stores the underlying data in addition to the metadata about the underlying data. In another embodiment, the persistence container 112 only stores metadata about underlying data stored in the data sources 102, and when data is being retrieved, pass through queries may be used to retrieve data from the data sources 102.

The semantic mapping engine 108 connects underlying data to a derived context. Semantic mapping may be accomplished through a combination of schema or metadata obtained from the smart ingestion engine 106, ontology that has been created and updated by the smart cache 104, and understanding of semantic distance or semantic similarity of data using machine learning algorithms 110. The semantic mapping engine 108 dynamically builds semantic models with new or updated data sources by applying machine learning algorithms to cluster and classify incoming new schema. In some embodiments, in order to update the semantic model, the semantic mapping engine 108 will run Support Vector Machine (SVM) algorithm to build a linear classification model that assigns new schema to one or more of the ontological concepts in the semantic model.

The intelligent or smart data service generator 114 (service generator 114) coordinates with applications running on recipient systems 116, the persistence container 112, and the semantic mapping engine 108 to generate data service interfaces, get and pass requests, and dispatch contextual responses to the applications.

Figure 2:
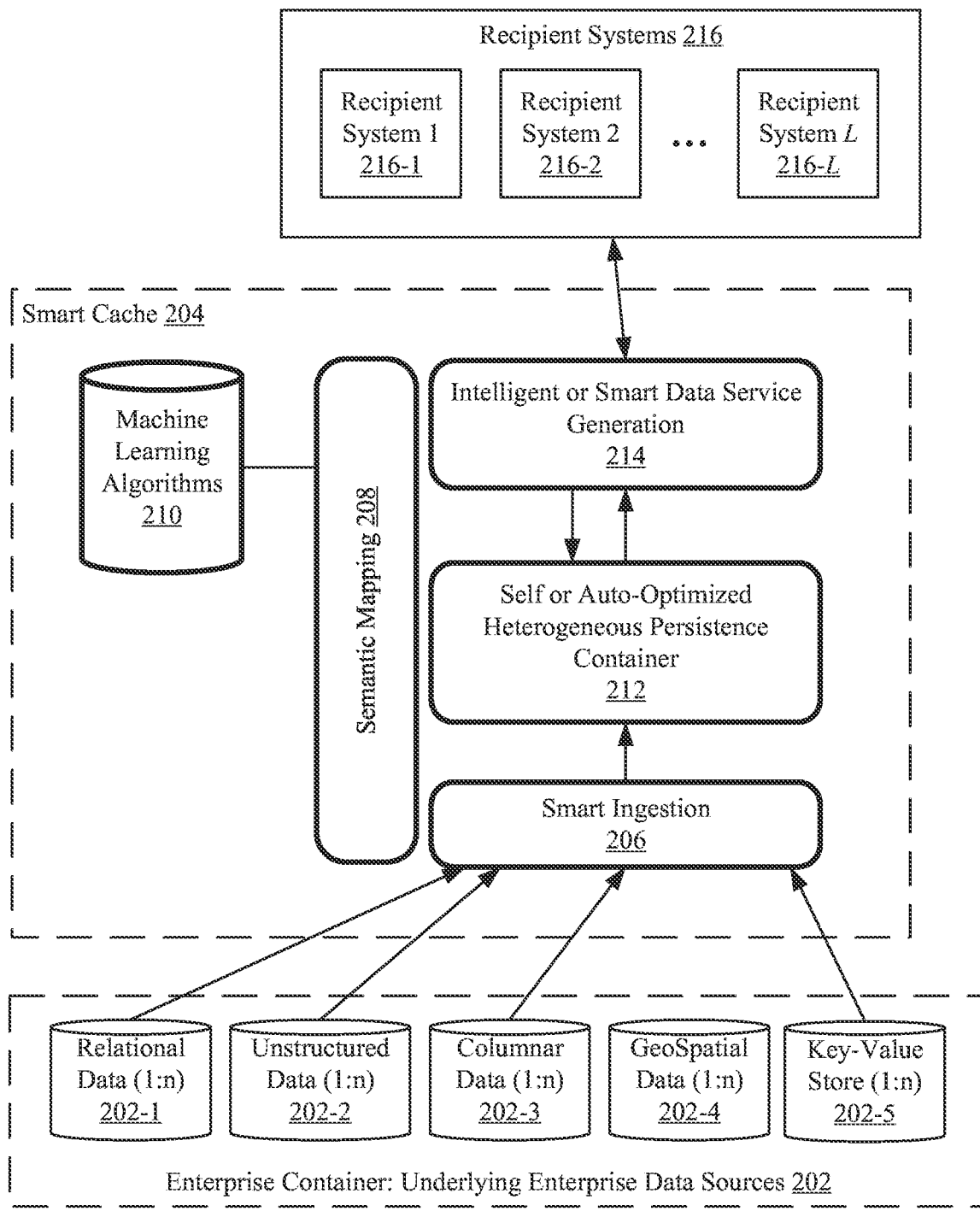
FIG. 2 illustrates a system utilizing a smart cache according to an embodiment of the disclosure.

FIG. 2 illustrates a system utilizing a smart cache according to an embodiment of the disclosure. Smart cache 204 contains similar components with structure and functions similar to that of FIG. 1. Enterprise container 202 contains different types of data sources including relational data 202-1, unstructured data 202-2, columnar data 202-3, geospatial data 202-4, and key-value store 202-5. Enterprise container 202 is shown in this example to be organized by a semantic/contextual grouping for clarity. The physical server(s) or database(s) holding the data sources need not be organized separately as shown. That is, a server or database may store heterogeneous data, for example, geospatial data and key-value data may be stored on the same server. Smart ingestion engine 206, semantic mapping engine 208, machine learning algorithms 210, persistence container 212, and service generator 214 have similar functions as their counterparts described in FIG. 1.

Figure 3:
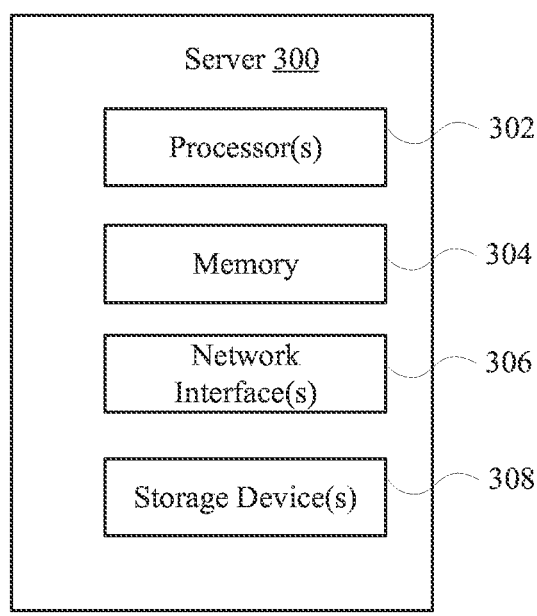
FIG. 3 illustrates components of a server according to an embodiment of the disclosure.

Each of the smart ingestion engine 206, semantic mapping engine 208, machine learning algorithms 210, persistence container 212, and service generator 214 may be implemented as software instructions stored in a memory and executed by a processor, such as the memory 304 and processor 302 in FIG. 3.

FIG. 3 illustrates components of a server 300 according to an embodiment of the disclosure. The server 300 may include one or more processors 302, memory 304, network interfaces 306, and storage devices 308. Although not explicitly shown in FIG. 3, each component provided is interconnected physically, communicatively, and/or operatively for inter-component communications in order to realize functionality ascribed to the server 300. To simplify the discussion, the singular form will be used for all components identified in FIG. 3 when appropriate, but the use of the singular does not limit the discussion to only one of each component. For example, multiple processors may implement functionality attributed to processor 302.

Processor 302 is configured to implement functions and/or process instructions for execution within server 300. For example, processor 302 executes instructions stored in memory 304 or instructions stored on a storage device 308. In certain embodiments, instructions stored on storage device 308 are transferred to memory 304 for execution at processor 302. Memory 304, which may be a non-transient, computer-readable storage medium, is configured to store information within server 300 during operation. In some embodiments, memory 304 includes a temporary memory that does not retain information stored when the server 300 is turned off. Examples of such temporary memory include volatile memories such as random access memories (RAM), dynamic random access memories (DRAM), and static random access memories (SRAM). Memory 304 also maintains program instructions for execution by the processor 302 and serves as a conduit for other storage devices (internal or external) coupled to server 300 to gain access to processor 302.

Storage device 308 includes one or more non-transient computer-readable storage media. Storage device 308 is provided to store larger amounts of information than memory 304, and in some instances, configured for long-term storage of information. In some embodiments, the storage device 308 includes non-volatile storage elements. Non-limiting examples of non-volatile storage elements include floppy discs, flash memories, magnetic hard discs, optical discs, solid state drives, or forms of electrically programmable memories (EPROM) or electrically erasable and programmable (EEPROM) memories.

Network interfaces 306 are used to communicate with external devices and/or servers. The server 300 may include multiple network interfaces 306 to facilitate communication via multiple types of networks. Network interfaces 306 may include network interface cards, such as Ethernet cards, optical transceivers, radio frequency transceivers, or any other type of device that can send and receive information. Non-limiting examples of network interfaces 306 include radios compatible with several Wi-Fi standards, 3G, 4G, Long-Term Evolution (LTE), Bluetooth®, etc.

The hardware components described thus far for server 300 are functionally and communicatively coupled to achieve certain behaviors. In some embodiments, these behaviors are controlled by software running on an operating system of server 300. Recipient systems 216 and enterprise container 202 may include one or more computer devices similar to server 300.

Figure 4:
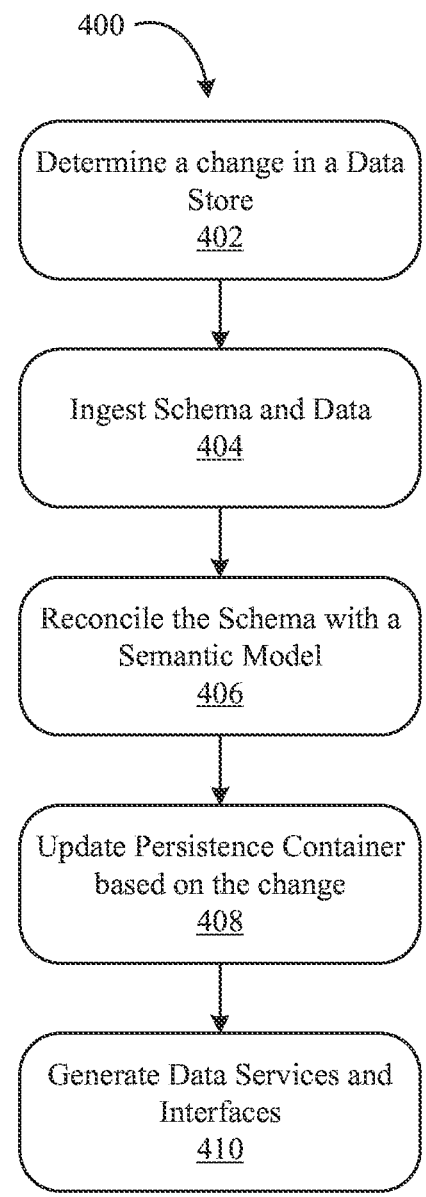
FIG. 4 illustrates an example flow diagram showing steps taken by the smart cache when a change occurs in a data store.

FIG. 4 illustrates an example process 400 showing steps taken by the smart cache 104 when a change occurs in data sources 102. At step 402, the smart cache 104 determines that a change has been made to underlying data sources 102. A change in the underlying data sources 102 includes, for example, adding a data source Y to data sources 102, removing a data source X from data sources 102, adding new data to data source 1 102-1, removing old data from data source 1 102-1, and updating old data from data source 1 102-1 with new data. The change in the underlying data sources 102 is communicated to the smart cache 104 through inspection of ingested data, through human trigger, or through automated feed from the underlying data sources 102.

At step 404, in response to the change in the underlying data sources 102, the smart cache 104 ingests schema and data with the smart ingestion engine 106. The schema relating to the data may be provided as part of the ingest or may be inferred from the data.

At step 406, the smart cache 104 reconciles the schema (or metadata) at step 404 with a semantic model utilizing the semantic mapping engine 108. Based on syntactic and semantic equivalence, the semantic mapping engine 108 will match and map the schema to the current semantics concepts of smart cache 104. Semantics concepts is a broad description that includes classes or elements of the semantic model. If syntactic and semantic equivalence mapping fails, the semantic mapping engine 108 will run machine learning algorithms from the machine learning algorithms depository 110 to classify the new schema with existing semantic model. In some embodiments, if classification through machine learning algorithms also fails, the semantic mapping engine 108 will automatically create new concepts in the ontology for the schema (or metadata) elements from the newly changed data that cannot be reconciled with existing ontology. Reconciling at step 406, thus, includes automatically structuring the data to adhere to a standard representation of the existing semantic model. Reconciling also includes automatically organizing the data to align the data to more than one data class within the existing semantic model when applicable. The automatically structuring and the automatically organizing may be improved through machine learning algorithms.

At step 408, once schema or metadata is updated and reconciled with existing semantic model, the change is reflected in persistence container 112. For example, if new data is added to data sources 102 and the smart cache 104 determines that the new data has been added, then the new data is ingested at step 404 and reconciled at step 406. After a schema is determined and a semantic model confirmed for the new data, the new data will be stored in the persistence container 112. The persistence container 112 stores the new data depending on type of data based on the semantic model of the data. That is, the persistence container 112 will merge the new data with data store of similar type. The persistence container 112 is organized to store data in relation to the different parts of the semantic model. That is, the persistence container 112 can take new data that has been classified based on a semantic model and add it to the set of data it already has associated with the specific data class. The persistence container 112 relates various data and stores them together physically. Ingested data is thus associated to a class in the semantic model. The persistence container 112 further merges semantic characteristics of the new data it receives with the semantic characteristics of the data it already has.

At step 410, the smart cache 104 generates data services and interfaces using the service generator 114. After step 408, the service generator 114 accesses the semantic model associated with the change at step 402 to intelligently generate data services that expose not only key entities in a data store, but also semantically related entities in other data stores in the persistence container 112. In other words, the service generator 114 takes the semantic model and asks the persistence container 112 for all the data associated with a specific semantic entity. Afterwards, the service generator 114, with an overview of all data associated with the specific semantic entity, generates an automated service entity that gives access to as much of the overview data that is relevant in the context of the semantic model. In some embodiments, the service generator 114 can generate the automated service entity that gives access to data that has been designated by an administrator as relevant under the specific semantic entity. A service is defined as an integration point that represents the contract of "if you give me data X, then I will give you data Y." The output of this flow is generated data services.

Figure 5:
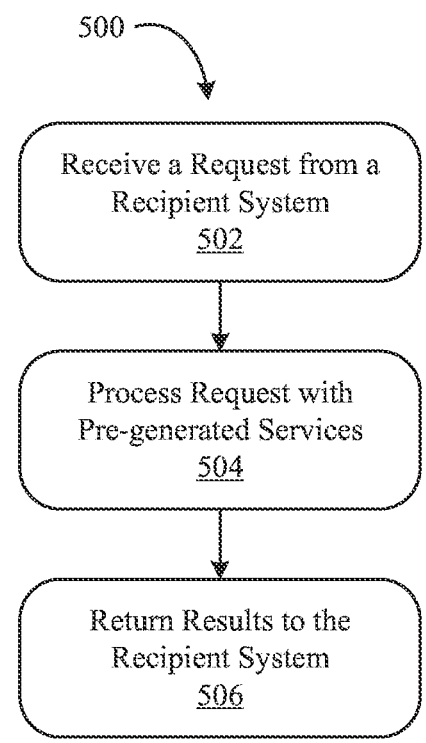
FIG. 5 illustrates an example flow diagram showing steps for interfacing with a smart cache.

FIG. 5 illustrates an example flow diagram showing steps for interfacing with a smart cache 104. At step 502, the smart cache 104 receives a request from a recipient system 116. The request may be an incoming request uniform resource locator (URL). The service endpoint determines the protocol supported by the smart cache 104, for example, URL is a hypertext transfer protocol (HTTP) example, but another service endpoint may support file based, wire protocol, or IBM MQ. After the request is received from the recipient system 116, at step 504, the service generator 114 will use pre-generated data services to find a service to perform necessary functions in response to the request. That is, at step 504, the service generator 114 processes the request with pre-generated services. At step 506, the service generator 114 returns results to the recipient system 116 in response to the request. The results returned includes data in response to the request or service call.

Figure 6:
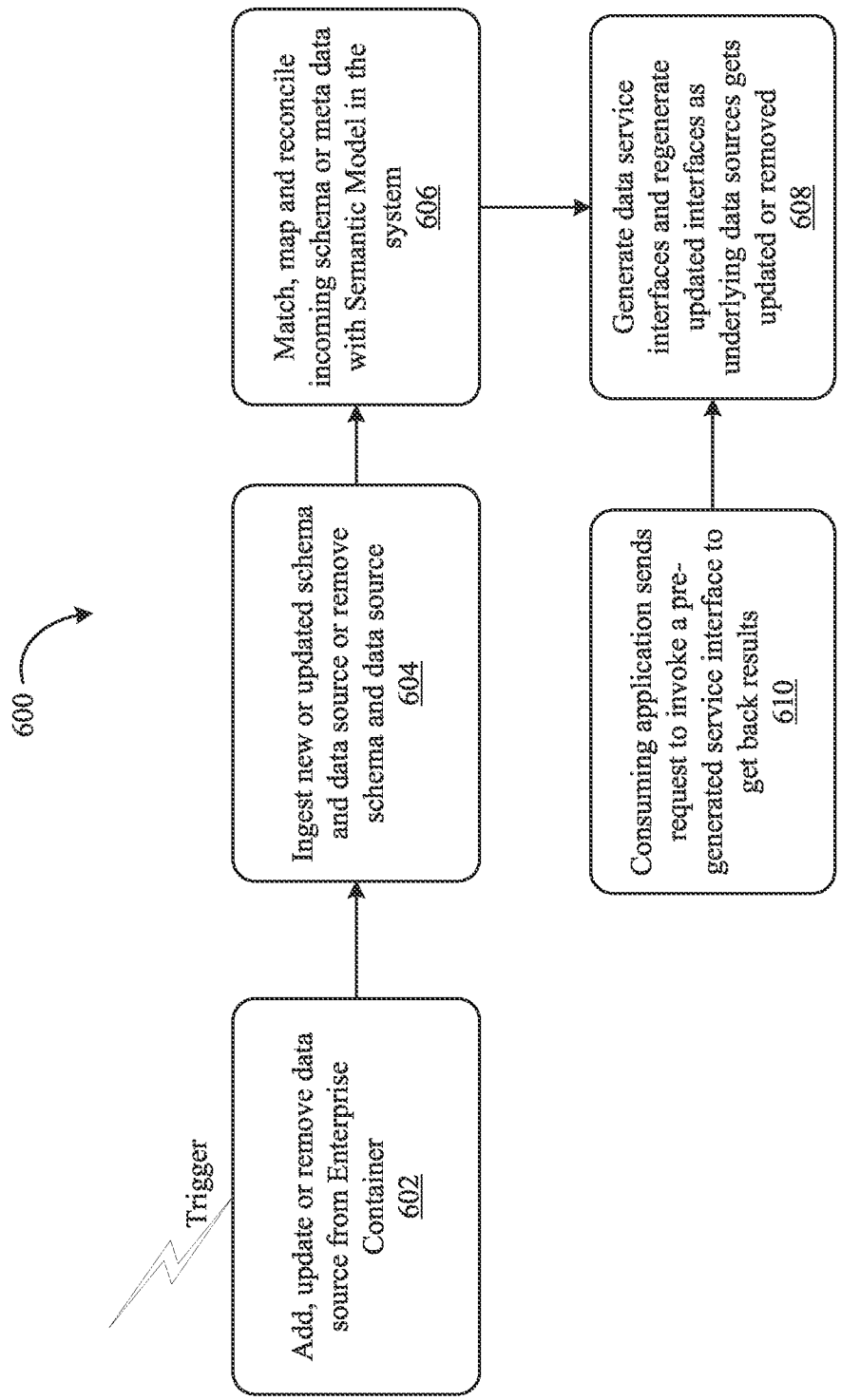
FIG. 6 illustrates a high level flow diagram of activities of a smart cache system in accordance with some embodiments of the disclosure.

FIG. 6 illustrates a high level flow diagram of activities of a smart cache system 204 in accordance with some embodiments of the disclosure. At step 602, data is added, updated, or removed from enterprise container 202.

At step 604, in response to data being added, updated, or removed from the enterprise container 202, the smart ingestion engine 206 is triggered to ingest new or updated schema and data or remove schema and data from the persistence container 212.

At step 606, the semantic mapping engine 208 matches, maps, and reconciles incoming schema or metadata with existing semantic model. In the case of adding or updating data in the enterprise container 202, if no semantic model exists, the smart ingestion engine 206 will create a new semantic model from the first data store that gets added to the persistence container 212.

At step 608, the service generator 214 generates appropriate interfaces and intelligently maintains compatibility of the interfaces until change in underlying data forces a break.

At step 610, the service generator 214 receives a request from a consuming application running on a recipient system 216. The service generator 214 invokes a pre-generated service interface to process and send back results to the calling application.

The smart cache 204 automatically optimizes cached data to meet usage needs of the consuming application running on the recipient system 216. The smart cache 204 monitors usage of the cached data and caches new representations of the cached data as needed to improve performance and/or throughput for higher demand or highly complex views. The automatically optimizing may be improved through machine learning algorithms The high level flow depicted in FIG. 6 may be further described in low level system flows. Depending on whether adding, updating, or removing data or a data source from enterprise container 202, steps 602, 604, 606, 608, and 610 may follow one or more embodiments described below.

In one embodiment, data and data sources can be added to the smart cache 204 as described below. The low level system flow described below may correspond to steps 602, 604, and 606.

The input is address of data source and schema or metadata for the data source. The process logic involves ingesting schema of data source. The system will extract schema or metadata of objects in the data store being ingested. Due to syntactic, structural and representational heterogeneity of the schemas, the extracted schema or metadata from the data store will need to be reconciled and updated with the semantic model of the system as the data source is being added, updated or removed.

Based on syntactic and semantic equivalence, the semantic mapping engine 208 will match and map the schema to the current ontology. If syntactic and semantic equivalence mapping fails, the semantic mapping engine 208 will run machine learning algorithms to classify new schema with existing semantic model. If classification through machine learning algorithms also fails, the semantic mapping engine 208 will automatically create new concepts in the ontology for schema or metadata elements from the new data store that cannot be reconciled with the existing ontology. For example, if data source has a field that has a metadata label MemberID, the semantic mapping engine 208 can reasonably guess that this is probably the identity of a member which can be mapped back to the semantic model. If an administrator already tells the semantic mapping engine 208 that MemberID represents the ID of a member, then a guess would not be necessary. Thus, in the absence of absolute certainty based on an administrator, the semantic mapping engine 208 performs semantic scanning of a semantic library to provide the best match based on probability in order to determine what the data means.

In some embodiments, machine learning involves running Support Vector Machine (SVM) algorithm to build a linear classification model that assigns new schema to one or more of the ontological concepts in the semantic model. SVM algorithm does not work for any data that is not labeled (e.g. metadata from unstructured data stores). In those scenarios, semantic mapping engine 208 will use unsupervised machine learning models to cluster incoming metadata and assign the data to appropriate ontological concepts in the semantic model.

Once schema or metadata is updated and reconciled with existing semantic model, the data from new data store will be ingested into the persistence container 212. Depending on type of data (relational, columnar, unstructured, key-value or Geo-spatial), the persistence container 212 will merge the new data with data store of similar type. The persistence container 212 knows where and how it stores data that corresponds to the different parts of the semantic model. Thus, the persistence container 212 can take this data that has been classified based on the semantic model and add it to the set of data it already has associated with the specific data class. The persistence container 212 relates various data and stores them together physically. The persistence container 212 further merges semantic characteristics of the new data it receives with the semantic characteristics of the data it already has. Therefore, the output of adding a data source is an updated semantic model and an updated data store.

In an embodiment, data and data sources can be updated in the smart cache 204 as described below. The low level system flow described below may correspond to steps 602, 604, and 606.

The update process is similar to the add process described above. The input is address of data source and schema/meta data for the data source. The process logic involves ingest schema of data source as in the Adding data source system flow. The system will extract schema of objects in the data store being ingested. Due to syntactic, structural and representational heterogeneity of the schemas, the extracted schema from the data store will need to be reconciled and updated with the semantic model of the system that was generated and updated constantly as the data source is being added, updated or removed.

Based on syntactic and semantic equivalence, the semantic mapping engine 208 will match and map the schema to the current ontology. If syntactic and semantic equivalence mapping fails, the semantic mapping engine 208 will run machine learning algorithms to classify new schema with existing semantic model. If classification through machine learning algorithms fails, the semantic mapping engine 208 will automatically create new concepts in the ontology for schema elements from the new data store that cannot be reconciled with the existing ontology.

Once schema is updated and reconciled with existing semantic model, the smart ingestion engine 206 will gather new data from the data store and ingest into the persistence container 212. Depending on type of data (relational, columnar, unstructured, key-value or Geo-spatial), the persistence container 212 will merge new data with data store of similar type. The output is updated semantic model and updated data store.

In an embodiment, data and data sources can be removed from the smart cache as described below. The low level system flow described below may correspond to steps 602, 604, and 606.

The input is address of data source and schema or meta-data for data source. The process logic follows that the system will extract schema or metadata of objects in the data store that have been removed. The semantic mapping engine 208 will automatically reconcile the concepts in the ontology based on schema elements that have been removed. Once the semantic model is updated, the smart ingestion engine 206 will remove appropriate data, corresponding to data that was removed from enterprise container 202, from the persistence container 212. The output is an updated semantic model and removed data from the persistence container 212.

In one embodiment, removing data or data source involves invalidating or deleting a particular record. The input to the smart cache 204 from the enterprise container 202 is the address or key to the record to be removed. The smart cache 204 uses its metadata and semantic information to determine which record is to be removed, where the record has been cached within the persistence container 212, and whether the record is in its raw source form or in any number of restructured forms. The appropriate record and its restructured forms are then tagged as invalid (removing them from the view of consuming systems) or removed from cache according to the rules for the subject area to which the record belongs.

In another embodiment, removing data or data source involves removing a data source when its contents are no longer considered valid for the smart cache 204. The smart cache 204 receives updated metadata identifying that a data source and all its content are no longer valid. In response to receiving the updated metadata, a process that scans the persistence container 212 for records related to that data source and all derivations of those records and tags them as invalid or removes them as per the rules for that subject area. The process would then scan the metadata for that source and update it to remove visibility or awareness of that source from any processes or consuming applications.

In yet another embodiment, removing data or data source involves dissociating a link to a data source while maintaining a book of record image of the existing data so that the cached data of the data source is still considered valid. The smart cache 204 receives updated metadata identifying that a data source is no longer actively providing data but the existing data cached from the data source is still valid. In response to receiving the updated metadata, a process that scans the metadata for that data source and updates it to identify that source as valid but no longer active is triggered. The smart cache 204 refers to the metadata adjusting its automated ingest processes to ignore that data source, but continue to allow consuming applications to use the data that is already cached from that data source.

In an embodiment, services can be generated by the smart cache 204 as described below. The low level system flow described below may correspond to step 608.

The input is trigger when a data source is added, updated or removed. The process logic follows that upon receiving the trigger when a data store is added, updated or removed, the service generator 214 will use the semantic model to intelligently generate data services that expose not only key entities in a data store, but also semantically related entities in other data stores in the persistence container 212.

In other words, the service generator 214 takes the semantic model and asks the persistence container 212 for all the data associated with a specific semantic entity. Afterwards, the service generator 214, with an overview of all data associated with the specific semantic entity, generates an automated service entity that gives access to as much of the overview data that is relevant in the context of the semantic model. In some embodiments, the service generator 214 can generate the automated service entity that gives access to data that has been designated by an administrator as relevant under the specific semantic entity. The service generated is stable as long as the underlying semantic model is stable and has not been changed by a subsequent data ingest process. A service is defined here as an integration point that represents the contract of "if you give me data X, then I will give you data Y." The output of this flow is generated data services.

In some embodiments, after generating services, the services are published. When publishing data services, the input is the generated data service. The system's process logic follows that service generator 214 will hold a registry to store service definitions, interfaces, operations, and parameters for consumers to discover and to invoke a performing of a required function. Whenever a data service is auto-generated, the service generator 214 will update the registry about new services. In other words, services are not just generated but are also catalogued so customers can look at what services the smart cache 204 supports and write code to call whichever service is of interest. The output is published service interfaces.

In an embodiment, a service may be called by a consuming application as described below. The low level system flow described below may correspond to step 610.

The input to the smart cache 204 may be an incoming request URL from a recipient system 216. The process logic follows that the service generator 214 will use pre-generated data services to find a service to perform necessary functions and return results to the calling application in response to the URL. The output is the data that comes back from a service call.

Figure 7:
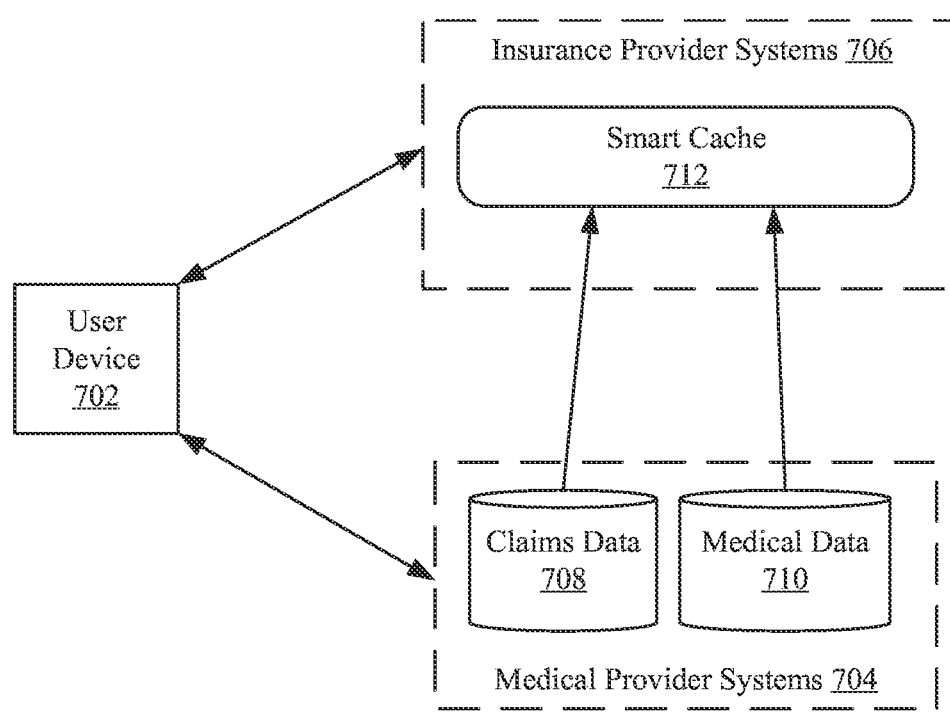
FIG. 7 illustrates an example of a smart cache system being used in a healthcare environment in accordance with some embodimetns of the disclosure.

FIG. 7 illustrates an example of a smart cache 712 being used in a healthcare environment in accordance with some embodimetns of the disclosure. In FIG. 7, a user device 702 may be communicably coupled to computing infrastructure of a medical provider (medical provider systems 704). The user device 702 may also be communicably coupled to computing infrastructure of an insurance provider (insurance provider systems 706). The user device 702 may be access one or both provider systems through the internet. In some embodiments, user device 702 is not communicably coupled to the medical provider systems 704. User device 702 may be an authorized user's smartphone, laptop computer, desktop computer, smart television, or any other computing device with a processor, memory, and networking capability.

Medical provider systems 704 is computing infrastructure associated with a healthcare provider. For example, the medical provider systems 704 may be computing infrastructure at a hospital, a clinic, or a computing cloud based system if the healthcare provider outsources management of its computing infrastructure. The medical provider systems 704 includes one or more computers, servers, databases, and other devices that support the healthcare provider's ability to electronically maintain patients' health records, clinical or medical data, claims data, and other information. In FIG. 7, medical provider systems 704 includes two databases, a claims data database 708 and a medical data database 710. Two databases are shown as an example, but one database can be used to hold both types of data.

Insurance provider systems 706 is computing infrastructure associated with an insurance provider for one or more patients being attended to at a healthcare facility associated with the medical provider systems 704. The insurance provider systems 706 obtains data from the medical provider systems 704. As an example, medical provder systems 704 provides claims data 708 and medical data 710 to the insurance provider systems 706. The insurance provider systems 706 includes a smart cache 712 according to some embodiments of the disclosure. The smart cache 712 takes an internal structure similar to that of FIGS. 1 and 2, thus having similar components.

Referring to the system in FIG. 7, for example, after Patient0 visits a hospital associated with medical provider systems 704, contents in the claims data 708 and medical data 710 are updated. The updated information is provided to smart cache 712, and the smart cache 712 commences an ingest process for both the claims data 708 and medical data 710. An update of Patient0's information serves as the trigger for step 602 in FIG. 6, the ingest process for both the claims data 708 and medical data 710 describes step 604, and reconciling ingested data with current semantics concepts in the smart cache 712 describes step 606. The data ingest and reconciling of the data ingest with current semantics concepts for claims data 708 and medical data 710 will be described separately.

The smart cache 712 ingests claims data 708 and reconciles the claims data 708 with its current semantics concepts. The ingestion process will be described with reference to smart cache components identified in FIG. 2. Claims information may be sent to the smart cache 712 via a batch process. Claims data may be structured, pipe-delimited data to be processed by a claim adjudication system in insurance provider systems 706. The semantic mapping engine 208 of the smart cache 712 scans and maps data elements in claims data 708 against its current semantics concepts (or current ontological concepts). For example, claim records may contain member identifier information, servicing provider information, condition and treatment codes, place of service, cost of service, and date of service among other details.

In this example, assume that Patient0 visited his physician, Doctor1, at her office for his diabetic conditions. He was diagnosed with adult onset of diabetes without complications (ICD-10 code: E11.9), and he was asked to use a blood glucose monitoring device to monitor his insulin levels. At step 606, the semantic mapping engine 208 establishes metadata linkage of the claim record to the correct member (Patient0) and physician (Doctor1) and builds a semantic representation of the claim and its associations and meanings according to ontological concepts for a claim based on its current semantics concepts. Descriptive text fields are scanned for matches to relevant claim concepts identified in the ontology. The semantic representation of the claim is thus enhanced with this additional information.

The smart cache 712 ingests medical data 710 and reconciles the medical data 710 with its current semantics concepts. Clinical information in medical data 710 may be sent to the smart cache 712. Clinical information may be in a text format, for example, text in extensible markup language (XML) format. The clinical information may include clinical notes and observations, recommendations, and supporting evidence. The semantic mapping engine 208 of the smart cache 712 maps data elements in the medical data 710 against its current semantics concepts (or current ontological concepts). The semantic mapping engine 208 establishes metadata linkage of the medical or clinical data to the correct member (Patient0) and physician (Doctor1) and builds a semantic representation of the clinical event and its associations and meanings according to the ontological concepts for a clinical encounter in its existing semantics concepts. In this example, a clinical encounter is the "subject area" so the smart cache 712 determines meaning based on its model of this "subject area." When new terms in clinical data are identified by the semantic mapping engine 208, the new terms are captured and attached for further identification and association. For example, Doctor1 explains to Patient0 how often and when he should be using the glucose monitor, and Doctor1 further makes some dietary recommendations to keep Patient0's blood sugar under control. These instructions may be entered as notes and classified as clinical information that may be ingested by the smart cache 712.

In an embodiment, user device 702 is a device accessible by Patient0. Patient0 uses an application running on the user device 702 to access his health information using a natural language search. In a natural language search, a search is performed using regular spoken language. For example, Patient0 can ask a question or type in sentences that describes information that he seeks, and this query or description is sent as a request to the insurance provider systems 706. Step 610 describes a computing device requesting data from the smart cache. The insurance provider systems 706 submits Patient0's request to the smart cache 712 where the semantic mapping engine 208 interprets the request data by mapping request terms to its existing ontological concepts and uses the semantic associations to find matching records. Step 608 describes the smart cache's response to the request at step 610.

For example, if the request at step 610 is for information about Patient0's diabetes diagnosis and use of the glucose monitor, the semantic mapping engine 208 determines that the request is about a health condition and clinical guidance about Patient0 and identifies this as sensitive information. The semantic mapping engine 208 then invokes a call to a rules engine to determine if the requestor is authorized to view Patient0's Protected Health Information. In this case, since Patient0 is the requestor and is authorized, the semantic mapping engine 208 identifies all records that relate to Patient0's diabetes and glucose monitor, which includes the claim record associated to diabetes and the clinical record describing the use of the glucose monitor.

The semantic mapping engine 208 along with the service generator 214 then determine how to appropriately package a response to the requestor, i.e., Patient0. The semantic mapping engine 208 identifies response formats for clinical condition information and for clinical guidance using its metadata library and invokes associated response message construction functions. The ingested claim data is used to generate appropriate fields in a response for the clinical condition, supplemented with condition descriptions from the ontological dictionary. The semantic mapping engine 208 identifies one or more sentences from Patient0's electronic medical record (EMR), which was ingested as medical data, that describes usage of the glucose monitor using the semantic understanding of the text. The one or more sententes are used to generate a response for the clinical guidance. The semantic mapping engine 208 adds other required information such as the doctor who made the recommendation and other supporting information as defined by the response metadata and semantic rules for that response type, such as, appropriate healthy actions in terms of diet and physical exercise that that were prescribed to the member. The service generator 214 provides these generated responses as reply to Patient0's query.

In the foregoing example, the smart cache 712 not only holds data for delivery, but also holds rich metadata with multiple associations learned from data gathered from interactions with medical providers, members, and validated third party sources. The smart cache 712 enables a member or an approved third party to make natural language queries on ingested data, and the smart cache 712 provides various forms of answers to questions the member or approved third party may have.

Embodiments of the disclosure provide a system and a method for creating and maintaining a smart cache with: (a) The ability to automatically ingest and semantically categorize existing diverse data sources; (b) Automated structuring, organization and optimization of the ingested data, based on semantic understanding of same or similar data elements; and (c) Automated generation of scalable service endpoints (or generated services) which are semantically consistent. Semantic consistency is accomplished because the generated services are based on the semantic model and are thus consistent with the semantic model. In some aspects, the generated endpoints are stable as long as the ingested sources remain semantically stable. In other aspects, the automation algorithms are continuously optimized using machine learning techniques.

Embodiments of the disclosure provide a method by which to automatically ingest diverse data sources and intelligently render the composite result as a set of defined, stable and scalable service endpoints—without requiring changes in the original data sources.

Embodiments of the disclosure may provide an internal advantage to an organization in the way the integration of software systems and data sources across a hybrid ecosystem is achieved. For example, software offerings for members or $3^{rd}$ parties may be based on some embodiments of the disclosure. This would enable smart disintermediation between data sources and data consumers, loosely coupled and scalable—support for multi-speed IT with easy harnessing/leverage of existing data. Therefore, embodiments of the disclosure provide intelligent mechanism to generate interfaces or data services that work with multitude of data sources and provide semantic linkage for delivering contextual results to consuming applications.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of integrating data across multiple data stores in order to provide data to one or more recipient systems, the method comprising:
ingesting diverse data from a plurality of data sources;
reconciling the ingested diverse data by updating semantic models based on the ingested diverse data;
storing the ingested diverse data based on one or more classification of the data sources according to the semantic models;
generating scalable service endpoints that are semantically consistent according to the classification of the data sources, wherein the generated scalable service endpoints are a plurality of application programming interfaces (APIs);
in response to receiving a call from the one or more recipient systems, determining a protocol based on the scalable service endpoints; and
responding to the call from the one or more recipient systems by providing data in the classification of the data sources.

2. The method according to claim 1, wherein the generated scalable service endpoints are stable as long as the ingested diverse data sources remain semantically stable.

3. The method according to claim 1, further comprising:
reconciling the ingested diverse data by structuring the ingested diverse data, wherein the structuring comprises realigning and reformatting data elements in the ingested diverse data into a standardized representation based on the semantic models.

4. The method according to claim 3, further comprising:
reconciling the ingested diverse data by organizing the ingested diverse data, wherein the organizing comprises aligning the ingested diverse data to multiple structures within the semantic models.

5. The method according to claim 4, further comprising:
optimizing the ingested diverse data by monitoring usage of the ingested diverse data and caching new representations of the ingested diverse data.

6. The method according to claim 5, wherein the structuring, the organizing, and the optimizing are continuously optimized using machine learning techniques.

7. The method according to claim 1, wherein the classification of the data sources includes relational data, unstructured data, columnar data, geo-spatial data, and key-value store.

8. The method according to claim 1, further comprising:
publishing the generated scalable service endpoints by updating a registry comprising service definitions, interfaces, operations, and parameters.

9. The method according to claim 1, further comprising:
determining a change in at least one data source from the plurality of data sources.

10. The method according to claim 9, wherein the change is a removal of data in the at least one data source.

11. A non-transitory computer readable medium having processor-executable instructions stored thereon, wherein the processor-executable instructions, when executed, facilitate:
ingesting diverse data from a plurality of data sources;
reconciling the ingested diverse data by updating semantic models based on the ingested diverse data;
storing the ingested diverse data based on one or more classification of the data sources according to the semantic models;
generating scalable service endpoints that are semantically consistent according to the classification of the data sources, wherein the generated scalable service endpoints are a plurality of application programming interfaces (APIs);
in response to receiving a call from the one or more recipient systems, determining a protocol based on the scalable service endpoints; and
responding to the call from the one or more recipient systems by providing data in the classification of the data sources.

12. The non-transitory computer readable medium according to claim 11, wherein the generated scalable service endpoints are stable as long as the ingested diverse data sources remain semantically stable.

13. The non-transitory computer readable medium according to claim 11, wherein the processor-executable instructions, when executed, further facilitate:
reconciling the ingested diverse data by structuring the ingested diverse data, wherein the structuring comprises realigning and reformatting data elements in the ingested diverse data into a standardized representation based on the semantic models.

14. The non-transitory computer readable medium according to claim 13, wherein the processor-executable instructions, when executed, further facilitate:
reconciling the ingested diverse data by organizing the ingested diverse data, wherein the organizing comprises aligning the ingested diverse data to multiple structures within the semantic models.

15. The non-transitory computer readable medium according to claim 14, wherein the processor-executable instructions, when executed, further facilitate:
optimizing the ingested diverse data by monitoring usage of the ingested diverse data and caching new representations of the ingested diverse data.

16. The non-transitory computer readable medium according to claim 15, wherein the structuring, the organizing, and the optimizing are continuously optimized using machine learning techniques.

17. The non-transitory computer readable medium according to claim 11, wherein the classification of the data sources includes relational data, unstructured data, columnar data, geo-spatial data, and key-value store.

18. The non-transitory computer readable medium according to claim 11, wherein the processor-executable instructions, when executed, further facilitate:
publishing the generated scalable service endpoints by updating a registry comprising service definitions, interfaces, operations, and parameters.

19. The non-transitory computer readable medium according to claim 11, wherein the processor-executable instructions, when executed, further facilitate:
determining a change in at least one data source from the plurality of data sources.

20. A system for integrating data across multiple data stores in order to provide data to one or more recipient systems, the system comprising:

one or more databases storing semantic models and machine learning algorithms; and one or more servers configured to:

ingest diverse data from a plurality of data sources;

reconcile the ingested diverse data by performing one or more of:

updating semantic models based on the ingested diverse data, structuring the ingested diverse data, wherein the structuring comprises realigning and reformatting data elements in the ingested diverse data into a standardized representation based on the semantic models, and organizing the ingested diverse data, wherein the organizing comprises aligning the ingested diverse data to multiple structures within the semantic models;

store the ingested diverse data based on one or more classification of the data sources according to the semantic models;

generate scalable service endpoints that are semantically consistent according to the classification of the data sources, wherein the generated scalable service endpoints are a plurality of application programming interfaces (APIs);

in response to receiving a call from the one or more recipient systems, determine a protocol based on the scalable service endpoints; and respond to the call from the one or more recipient systems by providing data in the classification of the data sources.

\* \* \* \* \*